(12) United States Patent
Bay et al.

(10) Patent No.: US 8,930,777 B2
(45) Date of Patent: Jan. 6, 2015

(54) METHOD FOR OPERATING AN ELECTRONIC DEVICE

(75) Inventors: Wolfgang Bay, Frankfurt (DE); Michael Henninger, Kelkheim (DE)

(73) Assignee: Continental Automotive GmbH, Hannover (DE)

( * ) Notice: Subject to any disclaimer, the term of this patent is extended or adjusted under 35 U.S.C. 154(b) by 329 days.

(21) Appl. No.: 12/742,862

(22) PCT Filed: Nov. 6, 2008

(86) PCT No.: PCT/EP2008/065085
§ 371 (c)(1),
(2), (4) Date: May 27, 2010

(87) PCT Pub. No.: WO2009/062884
PCT Pub. Date: May 22, 2009

(65) Prior Publication Data
US 2010/0251033 A1   Sep. 30, 2010

(30) Foreign Application Priority Data

Nov. 15, 2007  (DE) .......................... 10 2007 054 608

(51) Int. Cl.
*G06F 11/00*  (2006.01)
*G06F 11/07*  (2006.01)
(52) U.S. Cl.
CPC ................................. *G06F 11/0757* (2013.01)
USPC ................. 714/55; 714/14; 714/22

(58) Field of Classification Search
USPC .......................................................... 714/55
See application file for complete search history.

(56) References Cited

U.S. PATENT DOCUMENTS

| | | | |
|---|---|---|---|
| 6,081,752 A * | 6/2000 | Benson et al. .................. | 700/79 |
| 6,442,702 B1 * | 8/2002 | Ishikawa et al. .............. | 713/340 |
| 6,804,591 B1 * | 10/2004 | Miyazawa ....................... | 701/36 |
| 7,107,472 B2 * | 9/2006 | Weinold ........................ | 713/324 |
| 7,149,640 B2 * | 12/2006 | Lawrence et al. ............. | 702/108 |
| 8,151,124 B2 * | 4/2012 | Lee ................................. | 713/300 |
| 8,188,704 B2 * | 5/2012 | Reese et al. ................... | 320/104 |
| 2002/0143410 A1 * | 10/2002 | Yance et al. .................... | 700/11 |
| 2004/0143695 A1 | 7/2004 | Hashimoto et al. | |
| 2005/0251704 A1 * | 11/2005 | Wagner et al. ................. | 714/47 |
| 2010/0270968 A1 * | 10/2010 | Reese et al. ................... | 320/103 |

FOREIGN PATENT DOCUMENTS

| | | | |
|---|---|---|---|
| DE | 33 27 376 A1 | 2/1985 | |
| DE | 42 37 198 A1 | 5/1994 | |

* cited by examiner

*Primary Examiner* — Kamini Patel
(74) *Attorney, Agent, or Firm* — Cozen O'Connor

(57) ABSTRACT

A method for operating an electronic device that is supplied with electric power by a continuous energy accumulator. A predetermined ending of the first program is monitored in a program step by a second program. If the first program is not switched off as predetermined, the second program generates an error message which is displayed immediately when the device is switched on again.

8 Claims, 2 Drawing Sheets

METHOD FOR OPERATING AN ELECTRONIC DEVICE

PRIORITY CLAIM

This is a U.S. national stage of application No. PCT/EP2008/065085, filed on 6 Nov. 2008 which claims priority to the German Application No.: 10 2007 054 608.6, filed: 15 Nov. 2007; the contents of which are incorporated here by reference.

BACKGROUND OF THE INVENTION

1. Field of the Invention

The invention relates to a method for the operation of an electronic appliance supplied with electric current by a finite energy store, in which a command to switch off is followed by the execution of a first program.

2. Prior Art

Such appliances are frequently used in today's motor vehicles, and are known from practice. Such appliances, in the form of controllers, a piece of software, starts the first program, which stores data in a nonvolatile memory, when the ignition of the motor vehicle is recognized to have been switched off, the piece of software switches off its own supply of current. This protects a battery—in the form of a finite energy store—in the motor vehicle from discharge as a result of permanently supplying the controller.

A drawback of the known appliances, however, is that in the event of an error in the first program, for example when a processor has given a command to switch off the program, the electronics in the appliance do not switch off as a result of an error. However, this results in the finite energy store being emptied after a relatively long period. The error in the appliance or in the program execution remains concealed from the driver of the motor vehicle.

SUMMARY OF THE INVENTION

The invention is based at lest in part on a method of that allows an error in the first program to be ascertained and, when there are a plurality of appliances, the erroneous appliance to be identified.

The invention solves this problem by the command to switch off starting a second program which has a timer, and by virtue of the second program monitoring the intended termination of the first program and producing an error message if an intended period is exceeded when the first program is being terminated.

As a result of this configuration, the second program recognizes whether the first program is switched off as intended. If there is an error which delays the first program being switched off, said error is sensed as a result of the intended period being exceeded and the error message is output. It is therefore a simple matter to establish when and where an error has occurred and the relevant appliance is therefore not operating as intended. If there is no error, the second program and the timer can easily be switched off by means of the first program. As a result of this configuration, the command to switch off the appliance will be followed by the timer starting, such timer making a mark when a stipulated time has elapsed. The production of the mark after the stipulated time therefore forms the second program. The presence of the mark is already an indication of an error in the first program. In other words, no mark is set if the first program is terminated correctly. The production of the mark may be an entry in what is known as an EEPROM, for example. Said entry can be stored a plurality of times for safety. Suitable measures, such as an electric buffer store, make it possible to intercept the case of a dip in supply during the write operation. The entry may also contain a time stamp which indicates how long the appliance has already had an error. For this, it is expedient to set a plurality of marks at stipulable intervals of time.

In one embodiment of the invention, it is a simple matter to prevent the operating period of the appliance from being influenced by an error in the second program if the termination of the first program switches off the second program.

An error in the appliance or in devices connected to the appliance is preferably easily localized if the exceeding of the intended duration of the first program and/or the sensing of an error in the first program are stored.

In another advantageous embodiment of the invention, the period for which the termination of the first program is exceeded can easily be estimated if the second program makes an entry in the memory at stipulated intervals of time when the intended duration of the first program has been exceeded. The stipulated intervals of time may be constant or of different length.

In one embodiment of the invention, the risk of emptying the finite energy store can be kept particularly low in a motor vehicle if the appliance is in the form of a controller in a motor vehicle and if the error is indicated when the motor vehicle is started. The error message presented can be communicated to the driver of the motor vehicle or to a garage.

Preferably, the information about the stored error is output via an electrical, electromagnetic or visual communication interface. In the case of a motor vehicle, this forwarding can also be passed on to a garage diagnostic appliance via what is known as a CAN bus.

BRIEF DESCRIPTION OF DRAWINGS

The invention permits numerous embodiments. To illustrate its basic principle further, one of these is illustrated in the drawing and is described below. In the drawing.

DETAILED DESCRIPTION OF THE DRAWINGS

Figure 1:
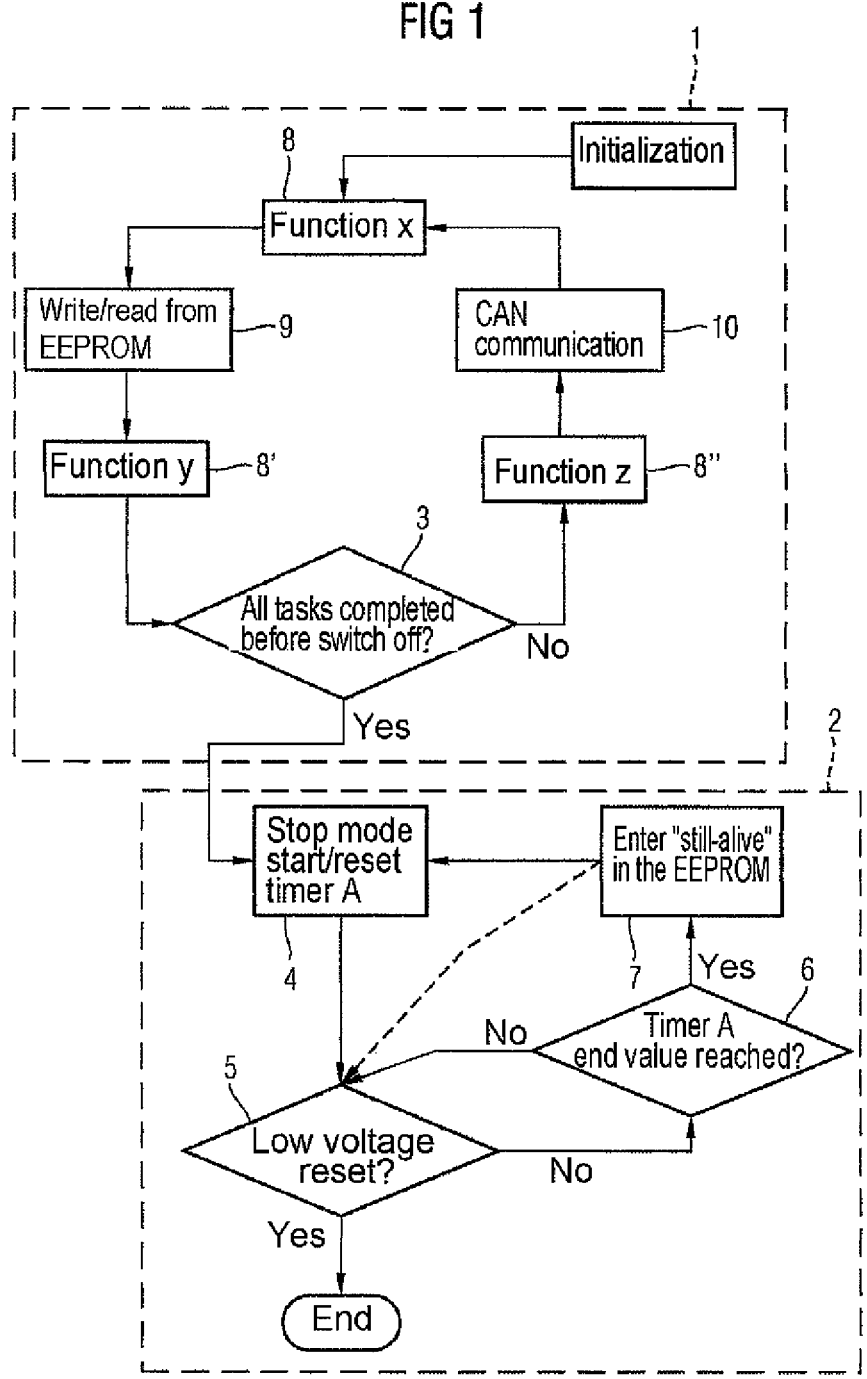
FIG. 1 is a flow chart of a method according to one embodiment of the invention.

FIG. 1 is a flow chart of a method according to one embodiment of the invention with a first program 1 and a second program 2. When the first program 1 is to be switched off, a program step 3 is used to check whether all the tasks have been completed before switching off. If this is the case, a timer 4 is started in the second program 2. The timer 4 records the time up to an intended period chosen during programming. If the first program 1 is switched off within the intended period, a low voltage reset 5 takes place to switch off the second program 2. The programs 1, 2 have thus been terminated. If the first program 1 is not switched off in the intended period, however, and the end value for the period is recorded as being reached in a further program step 6, an entry 7 is made in a nonvolatile memory, for example a memory in the form of an EEPROM, indicating that there is an error, that is to say that the first program 1 has not been switched off as intended. This entry 7 in the memory, possibly in combination with a time stamp, allows the error to be localized. This mark can be presented visually and/or audibly when the first program 1 is restarted.

In addition, FIG. 1 shows that the first program 1 has a plurality of functions 8, 8', 8", for example, and has the opportunity to perform read and write operations 9 on a memory in the form of an EEPROM. Furthermore, the first program 1 is able to communicate 10 with external appliances using what is known as a CAN interface. The step of switching off the first program 1 is therefore monitored by means of the second program 2. In the first program 1, the information about the possible absence of switching off is therefore passed on, for example via a CAN bus 13 which is shown in FIG. 2.

Figure 2:
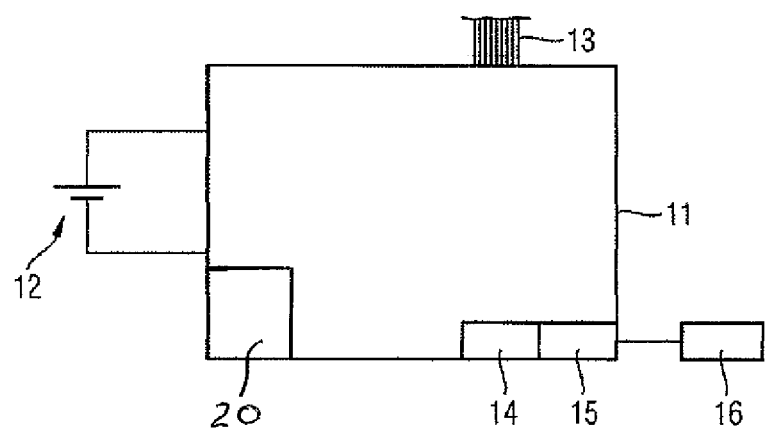
FIG. 2 is an appliance for carrying out the method according to the invention from FIG. 1.

For the purpose of illustration, FIG. 2 schematically shows an appliance 11 for carrying out the method from FIG. 1. The appliance 11 is in the form of a controller in a motor vehicle, for example for engine control, having a microprocessor 20, and is supplied with electric power by a finite energy store 12. The appliance 11 is in contact via what is known as a CAN bus 13 in the motor vehicle and, as memory 14, has the EEPROM, which is used to store the mark from the second program 2 with the time stamp. The CAN bus 13 is a two-wire bus. The CAN bus 13 can be used to read the ascertained error in the appliance 11 using a garage diagnostic appliance. In the embodiment shown, the appliance 11 has an output device 15 for presenting the mark stored in the EEPROM on a display panel 16 when the motor vehicle has been restarted and hence when the program is restarted.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an electronic appliance that is supplied with an electric current from a finite energy store, comprising:
   executing of a first program by a microprocessor in response to a switch off command;
   determining by the first program if all tasks of the first program have been executed;
   starting a second program by the microprocessor having a timer in response to the switch off command;
   monitoring an intended termination of the first program by the second program; and
   producing an error message at the microprocessor if an intended period is exceeded when the first program is being terminated.

2. The method as claimed in claim 1, wherein the termination of the first program switches off the second program.

3. The method as claimed in claim 2, further comprising:
   sensing an error in the first program;
      storing at least one of the exceeding of the intended period of the first program and the sensing of an error in the first program.

4. The method as claimed in claim 1, wherein the second program makes an entry in a memory at predetermined intervals of time when the intended period of the first program has been exceeded.

5. The method as claimed in claim 1, wherein the electronic appliance is configured as a controller in a motor vehicle and the error message is indicated when the motor vehicle is started.

6. The method as claimed in claim 3, wherein the information about the stored error is output by at least one of an electrical, electromagnetic and visual communication interface.

7. The method as claimed in claim 3, wherein the second program makes an entry in the memory at predetermined intervals of time when the intended period of the first program has been exceeded.

8. A method for operating an electronic appliance that is supplied with an electric current from a finite energy store, comprising:
   executing of a first program by a microprocessor in response to a switch off command;
   determining by the first program if all tasks of the first program have been executed;
   starting a second program by the microprocessor having a timer in response to a completion of all of the tasks of the first program;
   monitoring an intended termination of the first program by the second program; and
   producing an error message at the microprocessor if an intended period is exceeded when the first program is being terminated.

* * * * *